March 25, 1924.  
E. M. COLE  
SEED DROPPING MECHANISM  
Filed Sept. 20, 1920

Inventor  
EUGENE M. COLE,  
by J. Hanson Boyden,  
Attorney

March 25, 1924.
E. M. COLE
SEED DROPPING MECHANISM
Filed Sept. 20, 1920    2 Sheets-Sheet 2
1,487,919
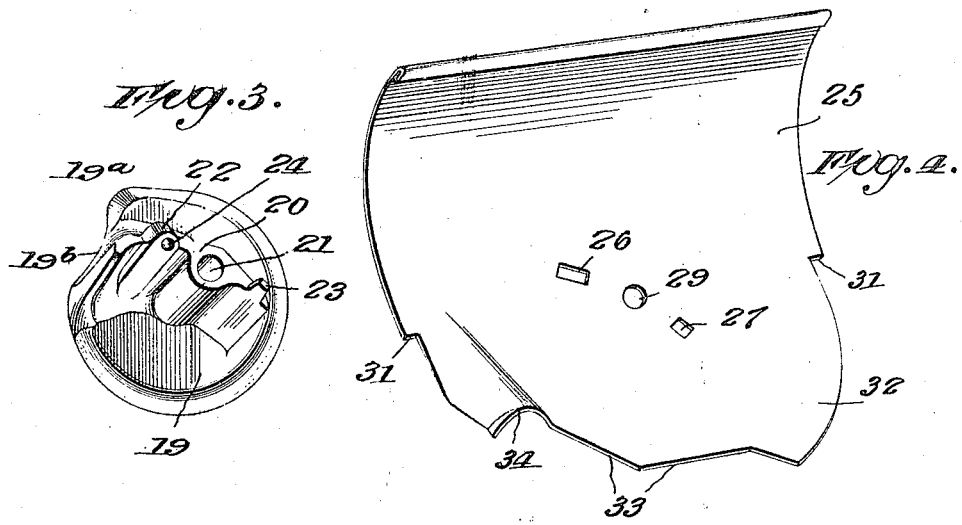
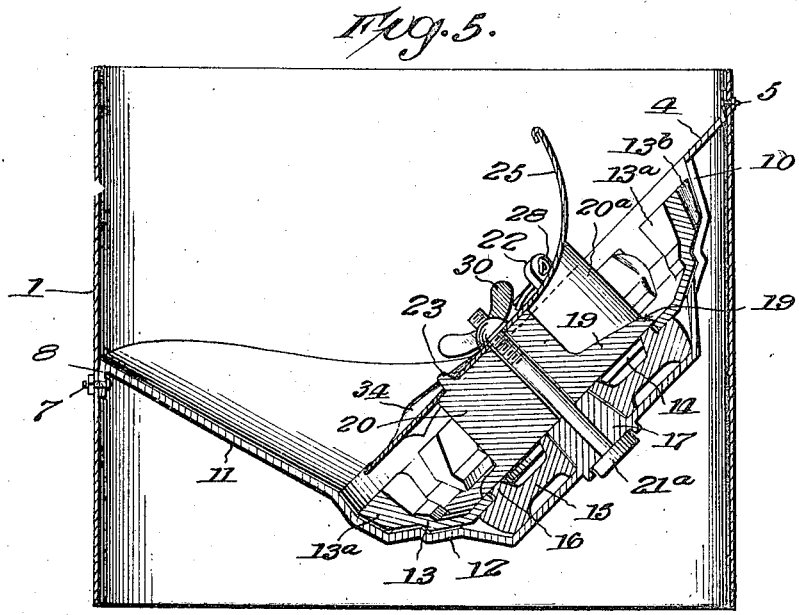
INVENTOR.
EUGENE M. COLE,
BY J. Hanson Boyden,
ATTORNEY Patented Mar. 25, 1924.

1,487,919

UNITED STATES PATENT OFFICE.

EUGENE M. COLE, OF CHARLOTTE, NORTH CAROLINA.

SEED-DROPPING MECHANISM.

Application filed September 20, 1920. Serial No. 411,420.

*To all whom it may concern:*

Be it known that I, EUGENE M. COLE, a citizen of the United States, residing at Charlotte, in the county of Mecklenburg and State of North Carolina, have invented certain new and useful Improvements in Seed-Dropping Mechanism, of which the following is a specification.

This invention relates to a seed dropping device for planters and more particularly to devices of the type shown in my prior patents, Reissue No. 14,692 and 1,290,090.

In planters of this type, the hopper is formed with an inclined bottom having an elevated outlet and a rotary disc or seed selecting device is mounted on this inclined bottom and serves to carry selected seeds upwardly to the outlet.

The upper face of this rotary disc is substantially fully exposed and in contact with the bulk of seed from which the selected seeds are taken, and as the disc revolves, there is a tendency for the bulk of seed to climb or work upwardly towards the outlet. One object of the present invention is to provide means for restraining this upward movement of the bulk of seed.

As fully described in the above mentioned patent, the seed discs of planters of this type are provided with peripheral teeth forming notches or seed cells. These cells are so shaped as to hold the selected seeds and carry them to the outlet, while any surplus seeds which may temporarily lodge on the teeth or in the pockets are discharged by gravity before the outlet is reached and fall back over the face of the disc into the bulk at the bottom of the hopper. Another object of the present invention is to provide improved means for guiding or directing the surplus seed as they are discharged from the cells, and causing them to fall back into a part of the hopper remote from the point at which they leave the hopper. More specifically, the present invention provides a fixed element extending diagonally upward and outward from the center of the disc, and so disposed as to restrain the upward movement of the bulk of unselected seeds at one side of the axis of rotation of the disc, and at the same time serve as a guide or chute to direct the surplus seeds discharged from the cells, so as to cause them to fall back into the hopper at a point on the other side of the axis of rotation of the disc.

A further object of the invention is to provide improved means for supporting the transverse partition or shield employed to hold back the mass of seed in the hopper and prevent it from enveloping the inclined disc or carrier. In my improved construction, I propose to mount or support this partition directly on the fixed member constituting the restraining means and guide, above referred to. I also contemplate securing the guide itself, together with the partition, to the cap which is used to retain the inclined disc or carrier in position.

A still further object of the invention is to improve the shape of the lower edge of the partition above referred to, to provide an opening between such edge and the bottom of the hopper, so formed as to facilitate the flow of seeds from the mass to the lower part of the inclined disc or carrier.

With the above objects in view, and to improve generally upon the details of such mechanism, my invention consists in the construction, combination and arrangement of parts hereinafter described and claimed, and illustrated in the accompanying drawings, in which—

Fig. 3 is a perspective view of my improved cap carrying with it the restraining and guiding means above mentioned.

Fig. 4 is a perspective view of the improved shield or partition which I employ in connection with the device shown in Fig. 3, and Fig. 5 is a vertical transverse section through one of the hoppers shown in Fig. 1, showing the parts in assembled relation.

Figure 1:
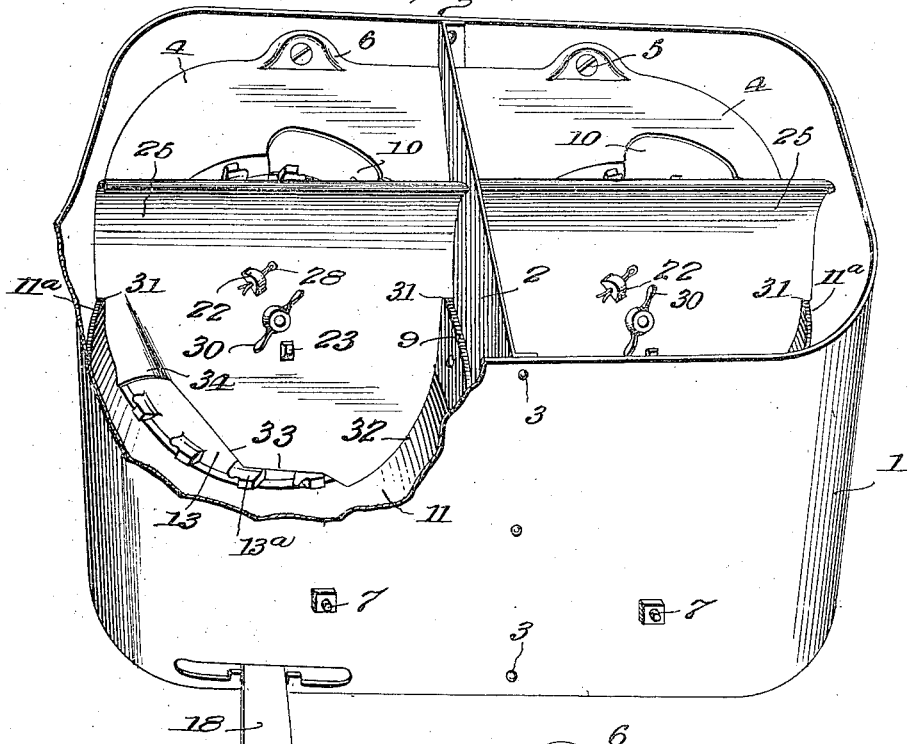
Fig. 1 is a perspective view, looking from the rear, of a double hopper equipped with my improvements, parts being broken away to show the construction.

Referring to the drawings in detail, 1 represents the casing enclosing the two hoppers shown in Fig. 1 and may conveniently be formed of sheet metal. Across this casing extends a vertical wall or partition 2, thus forming two hoppers which are identical. The partition 2 may be secured in position by means of screws or rivets 3, as shown in Fig. 1.

Figure 2:
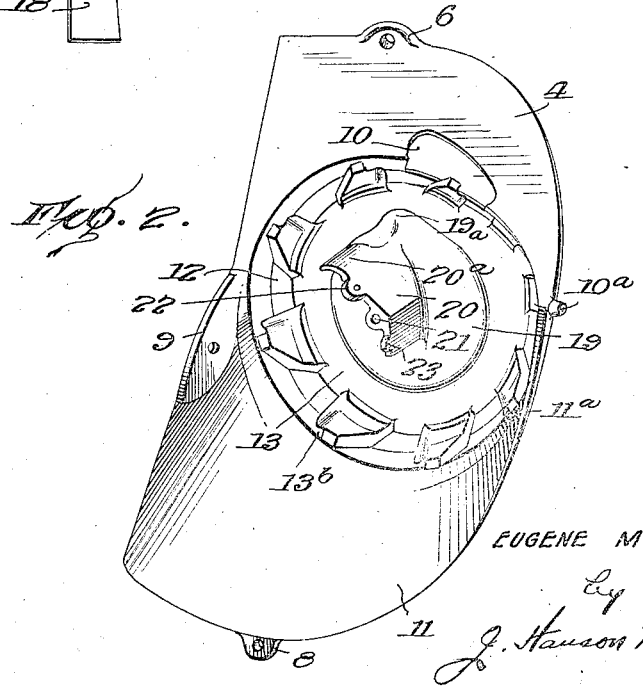
Fig. 2 is a perspective view of the bottom casting of one of such hoppers, showing the seed selecting device and my improved restraining and guiding means in position.

In each hopper, there is a bottom casting designated in its entirety by the numeral 4 and shown in perspective in Fig. 2. This casting is held in position in the casing 1 by screws or bolts 5 and 7 passing through lugs 6 and 8 as clearly shown in Figs. 1, 2 and 5. The inner edge of each casting 4 is provided with a perforated lug 9 and a bolt passes through these two lugs and the partition 2. A lug $10^a$ is also provided at one side of each casting as shown in Fig. 2 and this is adapted to receive a screw also. 10 designates an elevated outlet through which the selected seeds are discharged. A single seed spout (not shown) with a funnel shaped end is disposed under the two openings or outlets 10 to receive the seeds discharged therethrough.

It will be understood that the casting 4 constitutes the bottom of the hopper and when in position, as shown in Fig. 5, the rear portion 11 thereof is disposed at a slight incline and is somewhat in the shape of a scoop so as to direct the mass of seed downwardly toward the seed selecting device.

The casting 4 also comprises a portion 12 shaped to form a run-way or seat adapted to receive the seed selecting device or carrier. This carrier, as shown, consists of a disc 13, preferably somewhat dished as shown in my Patent No. 1,290,090, above mentioned, and is provided with a series of upstanding peripheral teeth $13^a$ having pockets or notches $13^b$ constituting seed cells. The center of this disc 13 is provided with an opening 14 adapted to seat upon a driving gear 15, such gear having lugs 16 engaging corresponding notches in the disc 13, all as shown in my above mentioned patents. The gear 15 is mounted for rotation on a stud or boss 17 carried by the hopper bottom and is driven by suitable gearing (not shown), the meshing of which is controlled by means of a lever 18 (see Fig. 1). This gearing, however, forms no part of the present invention.

The disc 13 is held in position by means of a cap 19, and this cap carries the member or plate 20 forming the restraining and guiding device, above referred to. This cap 19 is slightly larger than the opening 14 and over-lies the disc as clearly shown in Fig. 5. It is, as shown in Figs. 2 and 3, substantially circular, but is preferably provided with a slight projection $19^a$ and with a concavity $19^b$ for the purpose hereafter described. A hole 21 extends centrally through the cap 19 and member 20 and when in position this hole registers with a similar hole in the boss 17 and a bolt $21^a$ passes through these aligned holes, to hold the parts in position.

The member 20 is shown as forming integral with the cap 19, but may, of course, be otherwise secured thereto, if desired. It carries at its upper edge two lugs 22 and 23 arranged preferably on opposite sides of the opening 21 and at least one of the lugs, such as 22 is provided with a transverse opening 24.

25 designates my improved shield or partition which extends transversely across each hopper and serves to hold back the mass of seed and prevent it from enveloping the selecting device or disc. The lower portion of this partition is disposed substantially parallel with the disc or carrier 13, while the upper portion is curved upwardly and rearwardly, as shown in Figs. 1 and 5. The shield or partition is provided with holes 26 and 27 adapted to fit over the lugs 22 and 23 respectively, and when assembled as shown in Figs. 1 and 5 a cotter pin 28 is slipped through the opening 24, so as to fasten the shield 25 and cap 19 together. An opening 29 is also provided and arranged to fit over the end of bolt $21^a$, and a wing nut 30, engaging this bolt, serves to maintain all of the parts in position. It will be seen that by taking off this wing nut, the shield 25, together with the cap 19 and associated parts can be lifted as a unit from the hopper. The seed plate or disc 13 can then be readily removed. This method of assembling is of great practical convenience on account of the facility which it affords for changing seed plates.

The sides of the shield or partition 25 are provided with notches or shoulders 31 adapted to fit over the edge $11^a$ of the bottom casting, as shown in Fig. 1. On one side, the lower portion of the partition 25 is cut to a smooth curve as indicated at 32, adapted to snugly fit the inner surface of the scoop shaped portion 11 of the bottom as shown in Fig. 1, while the lower edge of the partition is cut away at 33 to form between itself and the bottom casting an opening through which the mass of seed may flow to the seed selecting device. It will be noted that the edges 33 intersect, so as to form an opening of angular shape, that is to say, an opening having a horizontal portion and an upwardly elongated portion extending in the direction of travel of the teeth $13^a$ of the seed disc. At the upper end of this elongated opening, the edge of the shield 25 is bent to form an arch as indicated at 34, thus providing a housing affording ample clearance for the upstanding peripheral teeth of the seed selecting device at the point where they pass under the shield in their upward movement.

It will be noted that the member 20 extends substantially radially in an upward and outward direction from the central opening 21 and that its lower face is slightly concave. This concave face serves as a guard to restrain the upward movement of the bulk of seed which the disc tends to drag around as it revolves. Thus, the bulk of seed is prevented from climbing upwardly toward the outlet 10. It will be particularly observed, however, that this guard terminates at a point a relatively great distance radially inward from the teeth 13ᵃ, so that it in no sense functions as a cut-off. In other words, the separation of the selected seeds from the surplus seeds is entirely by gravity, as in my above mentioned patents, the guard serving merely to prevent the undue accumulation of seeds adjacent the outlet.

Referring to Figs. 2 and 5, it will be seen that the upper surface 20ᵃ of the member 20 is more or less convex and cooperates with the cap 19 to form a kind of guide or chute over which the surplus seed discharged by gravity from the seed cells fall. The periphery of the cap is tapered to a thin edge and the peculiar configuration indicated by the reference numerals 19ᵃ and 19ᵇ assists in guiding these surplus seeds as they leave the cells and such seeds are caused to travel diagonally across the face of the cap 19 and to fall back into the bulk in the hopper at a point on the right hand side of the axis of rotation of the seed disc, as viewed in Fig. 2. Thus, it will be observed that the seeds travel up at one side of the axis of rotation and the surplus seeds are discharged by gravity and fall back into the hopper at the opposite side of such axis. In this way the bulk of seed is prevented from climbing or piling up in such a manner as to endanger the proper working of the device.

It will thus be seen that I have provided an improved construction, which in connection with my prior inventions, provides an exceptionally efficiently, simple and reliable seed selecting mechanism and it is thought that the many advantages of these improvements will be obvious without further discussion.

What I claim is:—

1. The combination with a hopper having a discharge outlet near its upper portion, of an inclined rotary device in said hopper having seed selecting means near its periphery for elevating seeds to the outlet, and a fixed guard disposed adjacent said device, but spaced radially inward from the seed selecting means, and adapted to restrain the upward movement of the bulk of unselected seeds.

2. The combination with a hopper having a discharge outlet near its upper portion, of an inclined rotary device in said hopper having seed selecting means near its periphery for elevating seeds to the outlet, and a fixed guard comprising a wall supported adjacent the axis of rotation of said rotary device and projecting in a direction substantially parallel with such axis, said wall extending radially outward from said axis but terminating short of said seed selecting means, and adapted to restrain the upward movement of the bulk of unselected seeds.

3. The combination with a hopper having a discharge outlet near its upper portion, of an inclined rotary seed selecting device in said hopper having pockets at its periphery for receiving selected seeds and elevating them to the outlet, and means spaced radially inward of said pockets for restraining the upward movement of the bulk of unselected seeds.

4. The combination with a hopper having a discharge outlet near its upper portion, of an inclined rotary seed selecting device in said hopper having pockets at its periphery for receiving selected seeds and elevating them to the outlet, and a fixed guard located between said pockets and the center of rotation of said device and spaced inwardly from the pockets for restraining the upward movement of the bulk of unselected seeds.

5. The combination with a hopper having a discharge outlet near its upper portion, of an inclined rotary seed selecting device in said hopper having pockets at its periphery for receiving selected seeds and elevating them to the outlet, and a laterally inclined fixed guard plate extending radially from the center of rotation of said device and at right angles to the plane thereof, and serving to restrain the upward movement of the bulk of unselected seeds.

6. The combination with a hopper having an outlet near its upper portion, of an inclined rotary carrier in said hopper, said carrier having seed pockets at its periphery adapted to select seeds from the bulk and elevate them to the outlet, and arranged to discharge surplus seed from the selected seed by gravity prior to reaching the outlet as the carrier rotates, and means for causing such surplus seed to fall back into the hopper at a point relatively remote from the point at which the selected seed left the bulk.

7. The combination with a hopper having an outlet near its upper portion, of an inclined rotary carrier in said hopper, said carrier having seed pockets at its periphery adapted to select seeds from the bulk and elevate them to the outlet, and arranged to discharge surplus seed from the selected seed by gravity prior to reaching the outlet as the carrier rotates, and means for causing such surplus seed to fall back into the hopper at a point on the opposite side of the axis of rotation of the carrier from that on which they were elevated.

8. The combination with a hopper having an outlet near its upper portion, of an inclined rotary carrier in said hopper, said carrier having seed pockets at its periphery adapted to select seeds from the bulk and elevate them to the outlet, and arranged to discharge surplus seed from the selected seed by gravity prior to reaching the outlet as the carrier rotates, and a diagonally extending plate forming a chute for directing the falling surplus seeds to a part of the hopper different from that from which the seeds were elevated.

9. The combination with a hopper having an outlet near its upper portion, of an inclined rotary disc in said hopper, said disc having seed cells around its periphery for selecting seeds from the bulk and elevating them to the outlet, said cells being constructed to discharge surplus seeds from the selected seeds by gravity over the face of the disc prior to reaching the outlet, and means for restraining the upward movement of the bulk of unselected seed on one side of the axis of rotation of the disc, and for causing the discharged surplus seeds to fall back into the bulk on the other side of said axis.

10. The combination with a hopper having an outlet near its upper portion, of an inclined rotary disc in said hopper, said disc having seed cells around its periphery for selecting seeds from the bulk and elevating them to the outlet, said cells being constructed to discharge surplus seeds from the selected seeds by gravity over the face of the disc prior to reaching the outlet, and a plate extending diagonally upward and outward from the center of rotation of the disc, said plate being shaped on its lower side to act as a guard to restrain the upward movement of the bulk of unselected seed, and being shaped on its upper side to constitute a chute to guide the discharged surplus seeds back into the bulk at the desired point.

11. The combination with a hopper having an outlet near its upper portion, of an inclined rotary disc in said hopper for selecting seeds and elevating them to the outlet, a cap for retaining the disc in position, and a guard plate carried by said cap and projecting at substantial right angles thereto for restraining the upward movement of the bulk of unselected seeds.

12. The combination with a hopper having an outlet near its upper portion, of an inclined rotary disc in said hopper, a cap for retaining said disc in position, said disc having seed cells around its periphery for selecting seeds from the bulk and elevating them to the outlet, said cells being constructed to discharge surplus seeds from the selected seeds by gravity over the face of said disc and cap prior to reaching the outlet, and a member carried by said cap and serving, on the one hand, to restrain the upward movement of the bulk of unselected seed, and, on the other hand, to direct the flow of the discharged surplus seeds.

13. The combination with a hopper having an outlet near its upper portion, of an inclined rotary carrier in said hopper for selecting seed from the bulk and elevating them to the outlet, a cap for retaining said carrier in position, and a partition extending across the hopper and serving to hold the mass of seed away from said carrier, said partition being supported by said cap.

14. The combination with a hopper having an outlet near its upper portion, of an inclined rotary carrier in said hopper for selecting seed from the bulk and elevating them to the outlet, a cap for retaining said carrier in position, and a partition extending across the hopper and supported by said cap, the lower edge of said partition being cut away so as to permit seed to flow from the mass into contact with said carrier.

15. The combination with a hopper having an outlet near its upper portion, of an inclined rotary carrier in said hopper for selecting seed from the bulk and elevating them to the outlet, a cap for retaining said carrier in position, and a partition extending across the hopper and serving to prevent the mass of seed in the hopper from enveloping said carrier, said partition being supported by said cap, and a bolt passing through said cap and partition and serving to hold the parts in position.

16. The combination with a hopper having an outlet near its upper portion, of an inclined rotary carrier in said hopper for selecting seed from the bulk and elevating them to the outlet, a cap for retaining said carrier in position, and a partition extending across the hopper, said partition being supported by said cap, a bolt passing through said cap and partition, and the bottom of the hopper, and means other than said bolt for securing said cap and partition together, whereby they may be removed from the hopper as a single unit.

17. The combination with a hopper having an elevated outlet, of a rotary inclined carrier in the hopper for selecting seeds from the bulk and delivering them to the outlet, and a partition extending across the hopper, said partition having its lower edge cut away on intersecting lines so as to provide between such edge and the hopper bottom an angular opening through which the mass of seed may flow to the carrier.

18. The combination with a hopper having an elevated outlet, of a rotary inclined carrier in the hopper for selecting seeds from the bulk and delivering them to the outlet, and a partition extending across the hopper, said partition having its lower edge cut away so as to provide between such edge and the hopper bottom an opening through which the mass of seed may flow to the carrier, and said partition being also formed to provide a channel extending upwardly from said opening along the upwardly moving side of the carrier.

19. The combination with a hopper having an elevated outlet, of a rotary inclined disc in the hopper, said disc having upstanding peripheral teeth forming seed cells adapted to carry selected seeds up to the outlet, and a partition extending across the hopper and having a portion lying adjacent and substantially parallel with said disc, the lower part of said partition being cut away to form an opening, and that portion of said partition adjacent said opening and overlying the upwardly moving edge of the disc being arched to provide a housing with ample clearance for said teeth.

In testimony whereof I affix my signature.

EUGENE M. COLE.